L. S. LEON.
NEEDLE THREADING DEVICE.
APPLICATION FILED NOV. 17, 1913.
1,162,938. Patented Dec. 7, 1915.
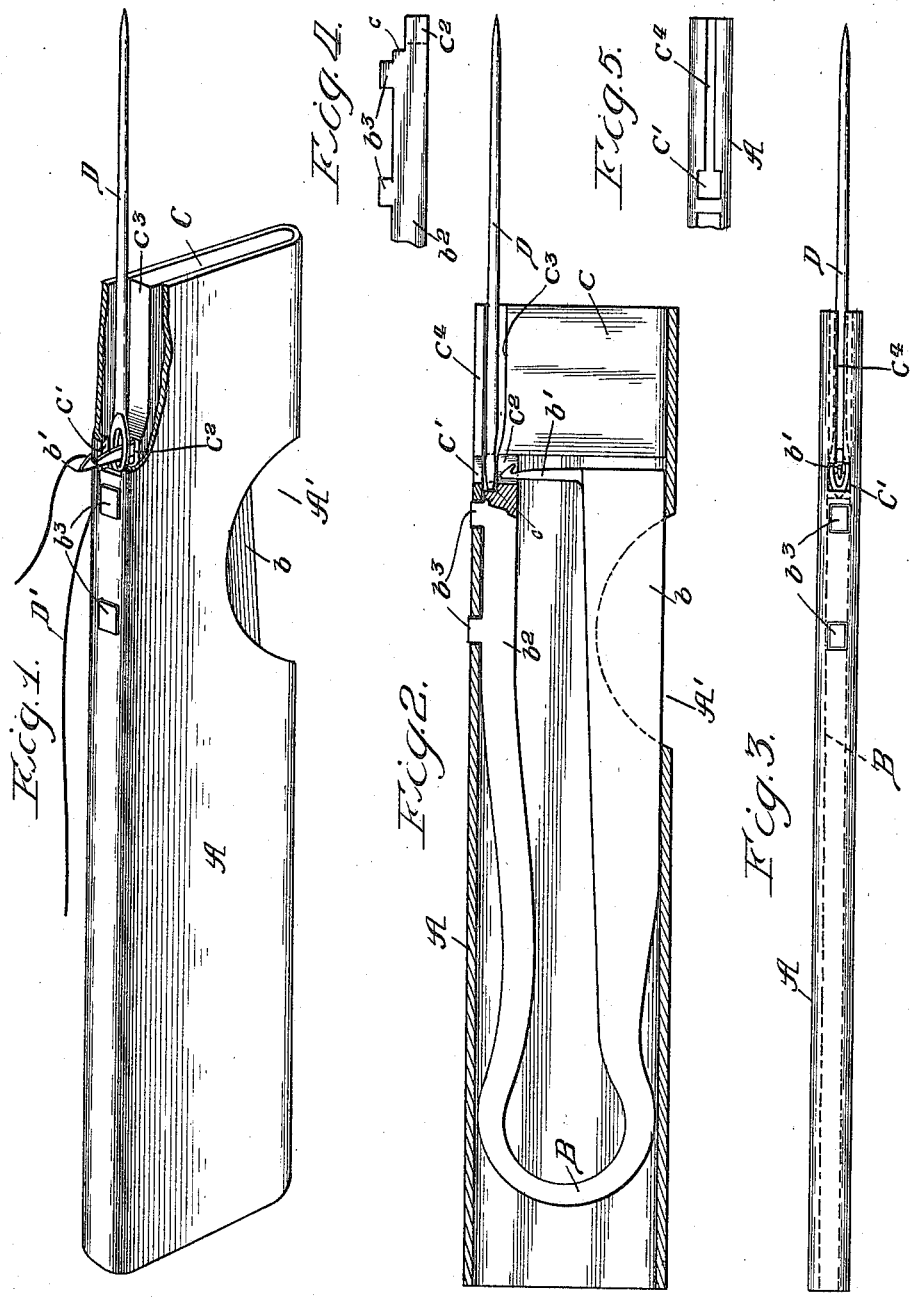

UNITED STATES PATENT OFFICE.

LEON S. LEON, OF CHICAGO, ILLINOIS.

NEEDLE-THREADING DEVICE.

1,162,938.   Specification of Letters Patent.   Patented Dec. 7, 1915.

Application filed November 17, 1913. Serial No. 801,328.

*To all whom it may concern:*

Be it known that I, LEON S. LEON, of Chicago, Cook county, Illinois, have invented certain new and useful Improvements in Needle-Threading Devices, of which the following, taken in connection with the drawing, is a description.

My invention has for its object the production of a device for threading needles, so constructed that it may be operated with one hand, is always ready for use, and which can be utilized with any form of hand sewing needle as now manufactured.

A further object of my invention is to provide such a device, the operative parts of which are incased so that they are protected against being easily bent or broken, all of which is accomplished by the casing construction which I have arranged as hereinafter more fully explained and pointed out in the claims.

In the accompanying drawings I have illustrated what I now consider the preferred form of my invention, although it is obvious that the same may be changed in various details, such as the size and shape of the different parts thereof without departing from the spirit of my invention and in these drawings, Figure 1 is an enlarged perspective view of my invention partly broken away to show the operation of threading the needle. Fig. 2 is an enlarged central longitudinal section of the casing exposing a spring operated hook for threading the needle. Fig. 3 is an enlarged transverse longitudinal sectional view showing the position occupied by the needle when it is ready to be threaded. Fig. 4 is a detail of one of the spring arms and Fig. 5 is a detail of one edge of the casing.

Referring to the drawing A represents a casing which may be flat or oval in shape, and which has a semi-circular recess A', on one longitudinal edge thereof for a purpose hereinafter explained. This casing A is open at each end thereof. Inside of this casing A is disposed a spring-piece B which is practically U-shaped, carrying on one side thereof, $b$, the hook $b'$, the opposite side $b^2$, having formed integrally therewith lugs $b^3$, $b^3$, which project through corresponding openings in the edge of the casing A thereby holding the spring-piece B in fixed position in said casing. On the end of the side $b^2$ of the spring B is formed a seat $c$ for the needle which is to be threaded, this seat being arranged in close proximity to an opening $c'$ in the edge of the casing A. A small hook $b'$ extends transversely of the casing from the side of the spring-piece B, and normally lies with the point of the hook in a slot or guide way $c^2$ formed in end of the side $b^2$ of the spring-piece B.

A plug C fits into the threading end of the casing A and is held in position by frictional engagement, or if desired a set screw may be used. One edge $c^3$ of this plug C, is curved as shown more particularly in Fig. 2, from the end of the plate to the point which comes in contact with the needle seat. This curved edge of the plug, with the wall of the casing A in proximity to it, forms a socket and guide for the needle D. From the opening $c'$ in the edge of the casing A to the end of the casing is a slot $c^4$ through which the thread is drawn with the needle after the threading operation is completed.

The operation is as follows: The device is assembled as shown in Fig. 2 with the spring-piece B inserted within the casing A the parts resting in normal position as they are shown. The needle D is placed in the socket formed by the edge $c^3$ of the plug 6, the shape thereof directing the needle to the seat $c$ so that the eye is in line with the opening $c'$. The casing is held between the thumb and finger of the operator who presses against the spring-piece B at the point of the recess A', thus carrying forward through the eye of the needle the hook $b'$ which projects through opening $c'$ as shown more clearly in Fig. 1. The thread B' is passed over the hook $b'$ and the pressure of the spring released, which action automatically withdraws the hook $b'$ carrying with it the thread which is drawn through the eye of the needle. The needle is then withdrawn with the thread through the eye, the long end of the thread passing through the slot $c^4$ until it is severed.

I claim:

1. In a needle threading device comprising an elongated casing having an opening in one edge thereof, a U-shaped spring piece in said casing, means for securing said spring piece in the casing, a needle seat formed in the end of one arm of the spring piece and coincident with a socket opening in the end of the casing, a threading hook secured to the other arm of the spring piece and adapted to be moved transversely of the opening forming the needle seat, substantially as described.

2. A needle threading device comprising a flat elongated casing having a recess along one edge thereof, a U-shaped spring piece in said casing, one arm of said spring piece being stationary, the other movable, the stationary arm having a needle seat formed therein coincident with an opening in the casing, a plug in the end of said casing having a groove in one edge thereof forming a guide-way to the needle seat, a threading hook secured to said movable arm and adapted when pressure is applied to said arm through the aforesaid recess to pass through the eye of a needle seated in the stationary arm and to draw a thread through the same when pressure upon said arm is released.

In testimony whereof I have signed this specification in the presence of two subscribing witnesses.

LEON S. LEON.

Witnesses:
WELLS GOODHUE,
CHARLES I. COBB.